Oct. 15, 1940.    R. S. BASSETT    2,217,655
APPARATUS FOR SEPARATING GAS FROM LIQUID
Filed June 20, 1939
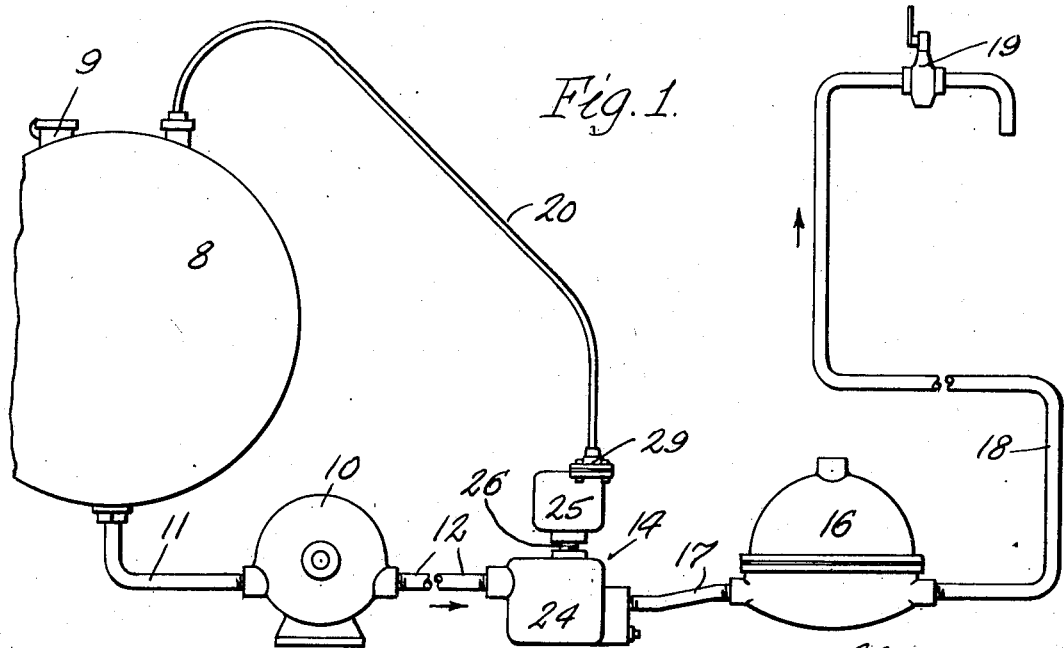
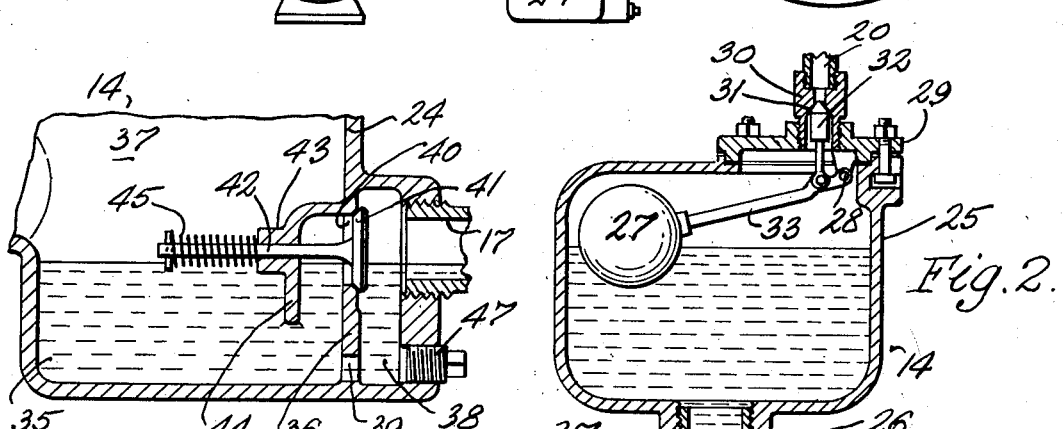
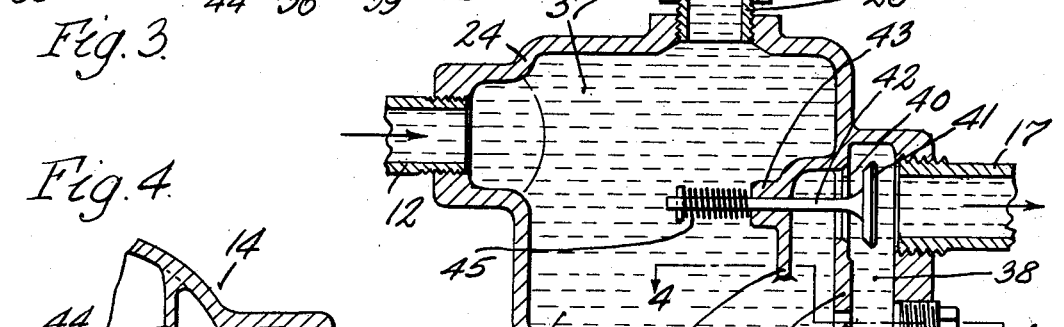
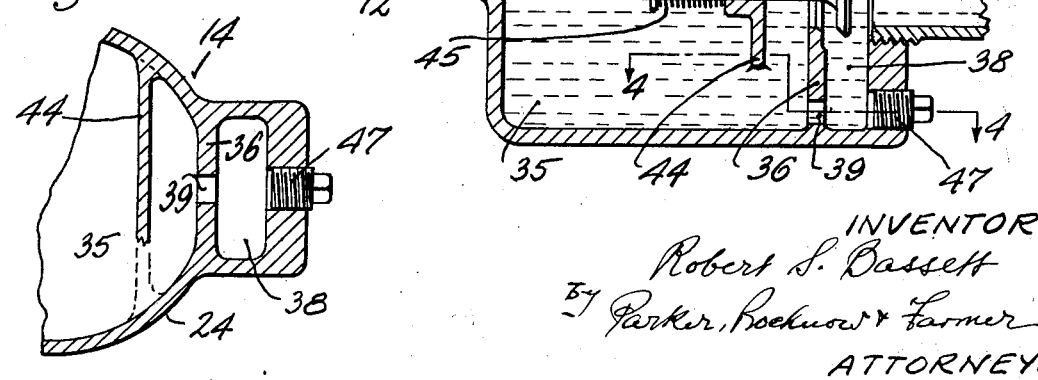
INVENTOR.
Robert S. Bassett
By Parker, Rockwow & Farmer
ATTORNEYS.

Patented Oct. 15, 1940

2,217,655

UNITED STATES PATENT OFFICE 2,217,655

APPARATUS FOR SEPARATING GAS FROM LIQUID

Robert S. Bassett, Buffalo, N. Y., assignor to Sylvia Bassett, Buffalo, N. Y.

Application June 20, 1939, Serial No. 280,097

3 Claims. (Cl. 183—2.5)

This invention relates to improvements in gas and liquid separating apparatus, and more particularly to apparatus of this kind for use in connection with the measuring of liquids, such for example as fuel oil, while the same is being delivered from one container to another.

In most types of meters used in connection with measuring apparatus, if air, gas or vapor passes through the meter, such gaseous medium will be measured, thus producing incorrect measurement of the actual liquid passing through the meter. Gases or vapors may be formed in pipe lines through the evaporation of the more volatile constituents of the oil or other liquid and air is often present in lines due to the lines becoming partially empty when measuring operations are stopped. The term "gas" is herein employed to include air and vapor.

One of the objects of this invention is to provide in a gas and liquid separating apparatus of improved construction for removing gas from the liquid, thereby increasing the accuracy of measurement of liquid.

A further object of this invention is to provide an improved gas separator for liquid measuring apparatus, having means of improved construction for creating in the separator sufficient pressure to discharge gas therefrom. It is also an object of this invention to provide an improved gas separator having a passageway submerged in the liquid being pumped, through which liquid can pass out of the separator, but which resists the passage of gas therethrough from the separator.

Another object of this invention is to provide improved means for separating gas from the liquid which include a pair of discharge passages, one of which is continuously open and the other of which is controlled by means of a back pressure valve.

Other objects of this invention will appear from the following description and claims.

In the accompanying drawing:

Fig. 1 is an elevation of an improved liquid measuring apparatus having an air and gas separating device embodying this invention applied thereto.

Fig. 2 is a central sectional elevation, on an enlarged scale, of an air and gas separating device embodying this invention, the parts being shown in the positions which they occupy when the apparatus is in operation.

Fig. 3 is a fragmentary sectional elevation of the lower portion only of the device shown in Fig. 2, the parts in this device being shown in different positions.

Fig. 4 is a sectional plan view thereof, on line 4—4, Fig. 2.

In Fig. 1, I have shown a liquid measuring apparatus in connection with which my improvements can be used. It will be understood, however, that it is not intended to limit this invention to the use of the particular installation illustrated in Fig. 1. In this figure, 8 represents a tank or container such, for example, as a storage tank for the liquid to be measured, or the tank of a tank car, the tank shown being provided at the upper portion thereof with the usual filling cap 9, which preferably has the usual vent hole through which air may enter to take the place of liquid which is withdrawn from the tank. 10 represents a pump of any suitable type, the inlet end of which is connected by a pipe 11 with the lower portion of the tank 8, and 12 represents a discharge pipe leading from the pump 10. The liquid passes from the pipe 12 into a separating device 14 in which gas, which may be in the form of vapor or air is separated from the liquid which is being handled. 16 represents a meter connected by means of a pipe 17 with the gas separating device 14, and 18 represents a pipe or duct through which measured quantities of the liquid may be discharged, the pipe preferably extending above the liquid level in the tank 8 and being provided with a control valve 19 near the end thereof. The pipe arrangement described is of a type which is suitable for use, for example, for measuring fuel oil and discharging it to a tank truck for delivery to a consumer. 20 represents a gas pipe or duct connecting the upper portion of the gas separator 14 with the upper portion of the tank 8, so that the air or gas discharged from the separator 14 is discharged into the top of the tank.

The separating device 14, which is shown more in detail in Figs. 2 to 4 includes a lower housing part 24 having an inlet port or opening with which one end of the pipe 12 is connected to discharge liquid from the pump 10 into the lower housing part 24. At the opposite side of the housing part 24, a discharge opening or port is provided, through which liquid is discharged to the meter 16 through the pipe 17. The separator also has an upper housing 25 suitably connected with the lower housing in any desired manner, for example, by means of a short pipe 26. The upper housing contains a float 27 attached to a lever which is pivotally mounted at 28 on a cap 29 of the housing 25. On this housing cap is provided a valve controlled gas venting port 30 by means of which gas collecting on the upper portion of the housing 25 may be discharged to the pipe 29. In the particular construction shown, the valve port is formed on a nipple or coupling member 31 and is of a tapering or frusto conical form, with which a valve 32 cooperates in such a manner that when the valve 32 is raised, it will contact with the conical seat and close the port leading to the vent pipe 29. The valve 32 has a stem which is suitably connected to the lever 33 of the float 27. It will be obvious from the construction shown in Fig. 2, that when the liquid rises in the chamber 25 and causes the float 27 to rise, the valve 32 will seat, thus preventing further escape of gas to the pipe 29. If, however, additional gas enters into the lower housing 24 through the pipe 12, this gas will quickly find its way through the connecting pipe 26 into the upper housing 25 and as it accumulates in the upper portion of the housing 25, eventually the liquid level will be lowered so that the float will cause the valve 32 to be moved from its seat, whereupon gas is discharged from the upper portion of the chamber 25 to the pipe or duct 29. Any other means for controlling the discharge of gas from the housing 25 in accordance with the level of liquid therein may be employed, if desired.

The discharge of gas from the separator is, of course, contingent upon the maintaining of a pressure in the separator materially greater than that of the atmosphere, so that the discharge of gas from the separator will be rapid and reliable, to prevent any of the gas from passing to the meter. For this purpose, a back pressure valve is provided at the discharge of the separator. It is also very desirable to provide another passage at the discharge of the separator through which a portion of the liquid may flow when the back pressure valve is closed. The drawing illustrates a construction in which one embodiment of this invention is incorporated, which construction is as follows.

The lower housing member 24 is provided with a pocket or sump 35 in the lower portion thereof, which is arranged below the level of the inlet pipe 12 and discharge pipe 17. This lower portion of the housing member 24 is also provided with a partition or wall 36 extending upwardly from the bottom of the housing member 24 and dividing the housing into a main gas separating chamber 37 and a smaller discharge chamber 38. This partition wall 36 is also provided in the lower portion thereof with an opening 39 through which communication is established between the separating chamber 37 and the discharge chamber 38. The partition 36 is also provided with a second or auxiliary opening 40 which is preferably controlled by means of a back pressure valve 41. This valve is preferably yieldingly held in closed position in any suitable manner so that a desired pressure will be created in the chamber 37 when the pump is operating in order to move this valve into its open position. In the particular construction shown, the valve is provided with a stem 42 which extends through a hole or opening in a boss or enlargement 43 formed on a downwardly extending baffle 44 which extends substantially parallel with the partition wall 36 and the sides and upper portions of which are connected with or formed integral with the walls of the housing 24, in such a manner that any liquid passing through the valve controlled auxiliary passage 40 must first pass downwardly below the lower edge of the baffle member 44. This baffle, therefore, materially helps to separate air from the liquid, since any air carried into the housing 24 will tend to rise and pass out of this housing to the connecting passage 26 rather than to pass downwardly below the lower edge of the baffle member 44.

The enlargement or boss 43 on the baffle 44 forms a guide for the valve stem 42 and a spring 45 serves to exert pressure on the end of the valve stem in a direction to urge the valve 41 yieldingly into position to close the port 40 in the partition wall 36.

The main or continually open discharge passage 39 is preferably of smaller cross sectional area than that of the passages in the conduits or pipes 12 and 17. Consequently, when the pump is started to measure a quantity of liquid, liquid will be discharged into the chamber 24 more rapidly than it is discharged through the opening 39. This results in creating a pressure of the liquid in the chamber 24, and this pressure is also exerted upon any gas which may be contained in this chamber or in the connected chamber 25, thus forcing this gas out through the valve 32 into the pipe 29 when sufficient gas has accumulated in the housing member 25 to cause the float 27 to open the valve 32. While the gas is being discharged, the pressure in the separator will immediately decrease, causing the back pressure valve 41 to close, for the purpose of maintaining a pressure within the separator. As soon as this gas is discharged, the valve 32 will be closed until more gas is admitted through the pipe 12. After the valve 32 has been closed, higher pressure will develop in the separator, which will, consequently, overcome the force exerted by the spring on the valve 41, and thus cause the valve 41 to be opened, thus permitting a full flow of liquid out of the housing 24 and into the pipe 17.

The pocket or sump 35 in the lower portion of the housing part 24 will remain filled with liquid during all normal operation of the apparatus, and this sump, consequently, forms a gas trap which prevents the flow of gas either into the main passage 39 or into the auxiliary passage 40. With the aid of this gas trap, the provision of a continuously open passage 39 in no way interferes with the efficient separation of gas from the liquid which is being measured.

47 represents a plug in the lower portion of the housing 24. By removing this plug, the housing 24 may be drained, and if the parts are arranged as shown in Fig. 1, the lower portion of the sump or pocket 35 will be approximately the lowest portion in the system. Consequently, by removing the plug 47, liquid remaining in the system may be drained.

There are several advantages resulting from the continually open passage leading from the lower portion of the chamber 24 of the separator to the meter. In the first place, this passage prevents the sudden flow of liquid to the meter which would result, if the back pressure valve 41 were suddenly opened by the accumulation of pressure in the housing member 24. Such sudden increase of pressure and flow of liquid results in a decrease in accuracy in the reading of the meter. Furthermore, the continuous open passage 39 also avoids any sudden stopping of the flow of liquid when the back pressure valve 41 closes, thus eliminating the possibility of an action equivalent to water hammer and also increasing the accuracy of the measurement by the meter. It will be noted that the continuously open passage 39 is located in the lower portion of the downwardly extending part or gas trap 35 of the housing 24 and this location of the passage 39 precludes the passing of any gas through this passage during the normal operation of the apparatus. The bottom of the sump or depressed portion 35 of the housing extends below both pipes 12 and 17, and consequently, during the normal operation of the apparatus, a supply of liquid will always be maintained in this portion of the housing 24 so that the opening 39 will be submerged, thus preventing the passage of gas through the opening 39.

The continuously open passage 39 has a further advantage, namely, that by forming of the same in the lower portion of the gas trap in the housing 24, substantially all of the liquid in the apparatus can be drained by removing the plug 47, whereas in systems heretofore provided in which a back pressure valve controlled passage is provided, liquid cannot pass through the valve passage, thus requiring two or more drain means.

I claim as my invention:

1. A gas separating device for automatically discharging gas from the delivery pipe line of a liquid measuring apparatus during operation thereof, said gas separating device having a chamber having inlet and discharge ports connected to said delivery pipe line and having a gas vent port in the upper portion thereof, a valve operable by the level of the liquid in said chamber to open and close communication through said vent port, said chamber having a lower portion extending below said inlet and discharge ports, a partition in said chamber arranged between said inlet and discharge ports and dividing said chamber into a gas separating compartment and a discharge compartment, said partition having two openings, one of which is arranged in the lower portion of said partition and the other of which is located above said first mentioned opening, a valve yieldingly closing the other opening and adapted to move into open position by pressure within the gas separating compartment of said chamber, said partition and said lower portion of said chamber forming a gas trap to prevent gas from passing through said lower opening to said discharge port, and a baffle in said chamber arranged adjacent to said other opening and between the same and said inlet port, said baffle being connected with said chamber so that most of the liquid passing from said chamber to said other opening must pass below said baffle, to prevent gas from passing through said other opening.

2. A gas separating device for automatically discharging gas from a delivery pipe line of a liquid measuring apparatus during the operation thereof, said device having a chamber having inlet and discharge ports connected to said delivery pipe line, a port for venting gas from said chamber, a valve operable by the level of the liquid in said chamber to open and close communication through said venting port, a lower portion of said chamber extending below said inlet and discharge ports, a partition in said chamber arranged between said inlet and discharge ports and dividing said chamber into a gas separating compartment and a liquid discharge compartment, said partition having two openings at least one of which is arranged in the lower portion of said partition and constantly open to prevent the closing of all communication to said liquid measuring apparatus at any time, a valve yieldingly closing the other opening and adapted to move into open position by pressure within the gas separating compartment of said chamber, said partition and said lower portion of said chamber forming a gas trap to prevent gas from passing through said openings to said discharge port, and a baffle in the lower portion of said chamber adjacent to said openings, said baffle being connected with said chamber so that liquid passing from said chamber and entering said openings passes below said baffle to prevent gas from entering the openings.

3. A gas separating device for automatically discharging gas from the delivery pipe line of a liquid measuring apparatus during operation thereof, said gas separating device having a chamber having inlet and discharge ports connected to said delivery pipe line and having a gas vent port in the upper portion thereof, a valve operable by the level of the liquid in said chamber to open and close communication through said gas vent port, a partition in said chamber arranged between said inlet and discharge ports and dividing said chamber into a gas separating compartment and a liquid discharge compartment, said partition having an opening near the bottom of said gas separating compartment and constantly open to prevent the closing of all communication through said partition at any time and also having an auxiliary passage through said partition, a valve yieldingly blocking said auxiliary passage and adapted to move into open position by pressure within the gas separating compartment of said chamber, and a baffle in said chamber between said auxiliary passage and said inlet port, said baffle being connected with said chamber so that liquid entering said opening passes below said baffle to prevent gas from entering the opening.

ROBERT S. BASSETT.